(12) United States Patent
Muraki et al.

(10) Patent No.: US 9,957,413 B2
(45) Date of Patent: May 1, 2018

(54) MEMBER FOR DYNAMO-ELECTRIC MACHINE, DYNAMO-ELECTRIC MACHINE, AND RESIN COMPOSITION

(71) Applicant: Hitachi Automotive Systems, Ltd., Hitachinaka-shi, Ibaraki (JP)

(72) Inventors: Takahito Muraki, Tokyo (JP); Satoshi Yamamura, Hitachinaka (JP); Masahiko Honma, Hitachinaka (JP); Yutaka Matsunobu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 218 days.

(21) Appl. No.: 14/902,442

(22) PCT Filed: May 16, 2014

(86) PCT No.: PCT/JP2014/063011
§ 371 (c)(1),
(2) Date: Dec. 31, 2015

(87) PCT Pub. No.: WO2015/004987
PCT Pub. Date: Jan. 15, 2015

(65) Prior Publication Data
US 2016/0376466 A1  Dec. 29, 2016

(30) Foreign Application Priority Data
Jul. 9, 2013 (JP) .................. 2013-143786

(51) Int. Cl.
*H02K 3/00* (2006.01)
*H02K 3/34* (2006.01)
(Continued)

(52) U.S. Cl.
CPC ......... *C09D 167/06* (2013.01); *C09D 167/00* (2013.01); *H01B 3/30* (2013.01);
(Continued)

(58) Field of Classification Search
CPC .................. H02K 3/30; H02K 15/12
(Continued)

(56) References Cited

U.S. PATENT DOCUMENTS

| | | | | |
|---|---|---|---|---|
| 2009/0269488 A1* | 10/2009 | O'Brien | ............... | C08G 65/485 427/104 |
| 2010/0080892 A1* | 4/2010 | O'Brien | ............... | C08F 283/08 427/104 |

(Continued)

FOREIGN PATENT DOCUMENTS

| | | |
|---|---|---|
| JP | 2002-50249 A | 2/2002 |
| JP | 3770263 B2 | 4/2006 |

(Continued)

OTHER PUBLICATIONS

International Search Report (PCT/ISA/210) issued in PCT Application No. PCT/JP2014/063011 dated Aug. 19, 2014, with English translation (two (2) pages).

(Continued)

*Primary Examiner* — Jose Gonzalez Quinone
(74) *Attorney, Agent, or Firm* — Crowell & Moring LLP

(57) ABSTRACT

A resin composition (601) containing the following is prepared: a base unsaturated-polyester resin and/or a base vinyl-ester resin; a base radical-polymerizable monomer; a radical-polymerizable monomer having a thermally latent isocyanate group; a photo-radical polymerization initiator; and an alkylborane and/or an alkoxyamine derivative. A stator coil (60) in a stator (20) in a dynamo-electric machine (10) is coated using said resin composition (601) only, i.e. just the one resin composition. An insulated coated section (29A) and a conductor-exposing section (29B) of a join-side coil end (62) are also coated using said resin composition (601).

8 Claims, 7 Drawing Sheets

(51) Int. Cl.
  *H01F 27/28*   (2006.01)
  *C09D 5/44*    (2006.01)
  *C09D 167/06*  (2006.01)
  *H01B 3/30*    (2006.01)
  *H01B 3/42*    (2006.01)
  *H02K 3/30*    (2006.01)
  *H02K 3/38*    (2006.01)
  *C09D 167/00*  (2006.01)

(52) U.S. Cl.
  CPC ............... *H01B 3/42* (2013.01); *H02K 3/30* (2013.01); *H02K 3/38* (2013.01)

(58) Field of Classification Search
  USPC .................. 310/179, 215; 336/221; 525/125
  See application file for complete search history.

(56) References Cited

U.S. PATENT DOCUMENTS

| 2010/0151242 | A1* | 6/2010 | Boehm | H02K 3/30 |
| | | | | 428/370 |
| 2011/0316661 | A1* | 12/2011 | Muraki | C09J 4/06 |
| | | | | 336/221 |
| 2013/0209802 | A1* | 8/2013 | Muraki | H01B 3/30 |
| | | | | 428/370 |

FOREIGN PATENT DOCUMENTS

| JP | 2012-7081 A | 1/2012 |
| JP | 2012-90433 A | 5/2012 |

OTHER PUBLICATIONS

Extended European Search Report issued in counterpart European Application No. 14822400.9 dated Mar. 17, 2017 (eight (8) pages).

* cited by examiner

FIG. 7

| | | COMPOSITION EXAMPLE 1 | COMPOSITION EXAMPLE 2 | COMPOSITION EXAMPLE 3 | COMPOSITION EXAMPLE 4 | COMPOSITION EXAMPLE 5 | COMPARATIVE EXAMPLE 1 | COMPARATIVE EXAMPLE 2 |
|---|---|---|---|---|---|---|---|---|
| (1) | COATABILITY (COATING THICKNESS) | 35 μm | 30 μm | 50 μm | 50 μm | 45 μm | 0 μm | 0 μm |
| | PERMEABILITY | ○ | ○ | ○ | ○ | ○ | ○ | ○ |
| (2) | ADHESIVENESS (ADHESION) | 1.0 kN | 1.0 kN | 1.1 kN | 1.1 kN | 1.1 kN | 1.0 kN | 0.8 kN |
| (3) | HEAT RESISTANCE (HEAT RESISTANT TEMPERATURE) | H TYPE (180°C) | H TYPE (180°C) | H TYPE (180°C) | H TYPE (180°C) | F TYPE (150°C) | H TYPE (180°C) | F TYPE (150°C) |

MEMBER FOR DYNAMO-ELECTRIC MACHINE, DYNAMO-ELECTRIC MACHINE, AND RESIN COMPOSITION

TECHNICAL FIELD

The present invention relates to a member for a dynamo-electric machine, a dynamo-electric machine, and a resin composition.

BACKGROUND ART

In recent years, a small dynamo-electric machine having a high output has been demanded. As such a dynamo-electric machine, for example, a dynamo-electric machine which has obtained a high output by inserting many conductor segments having a rectangular cross section into a slot, and then joining a pair of ends of the conductor segments to each other and forming a stator coil to thereby improve a space factor and cooling performance, is known.

There is a stator of a vehicle AC generator obtained by thinly attaching a first resin composition to a first coil end group in which a turn portion is formed and a second coil end group in which a plurality of joining portions obtained by joining ends are disposed, and by thickly attaching a second resin composition only around the joining portions of the second coil end group, in order to improve insulation performance (for example, refer to PTL 1). There is also an electrical apparatus defining a material of a second resin composition used for a joining portion (for refer to PTL 2).

CITATION LIST

Patent Literature
PTL 1: JP 3770263 B1
PTL 2: JP 2012-90433 A

SUMMARY OF INVENTION

Technical Problem

As described above, in the related art, two kinds of resin compositions are used. Therefore, two manufacturing equipments are necessary.

Solution to Problem (1) A member for a dynamo-electric machine according to claim 1 is characterized in that the member for a dynamo-electric machine includes a coil formed with an insulation coated conductor and that the coil is coated using a resin composition containing a base unsaturated-polyester resin and/or a base vinyl-ester resin, a base radical-polymerizable monomer, a radical-polymerizable monomer having adhesiveness to the insulating film of the insulation coated conductor, and a photo-radical polymerization initiator.

(2) A dynamo-electric machine according to claim 5 is characterized by using the member for a dynamo-electric machine according to any one of claims 1 to 4.

(3) A resin composition according to claim 6 is characterized by containing a base unsaturated-polyester resin and/or a base vinyl-ester resin, a base radical-polymerizable monomer, a radical-polymerizable monomer having adhesiveness to the insulating film of the insulation coated conductor, and a photo-radical polymerization initiator.

Advantageous Effects of Invention

According to the present invention, it is possible to provide a resin composition used for a member for a dynamo-electric machine, a dynamo-electric machine, or the like, having an excellent insulating property and coil fixing property. In addition, only by using the above-described one kind of resin composition, it is possible to provide a member for a dynamo-electric machine and a dynamo-electric machine having an excellent insulating property and coil fixing property. Therefore, it is possible to provide a member for a dynamo-electric machine and a dynamo-electric machine having high productivity.

BRIEF DESCRIPTION OF DRAWINGS

FIG. 7 illustrates a table indicating evaluation results in the present invention.

DESCRIPTION OF EMBODIMENTS

——Embodiments of Resin Composition——

Figure 1:
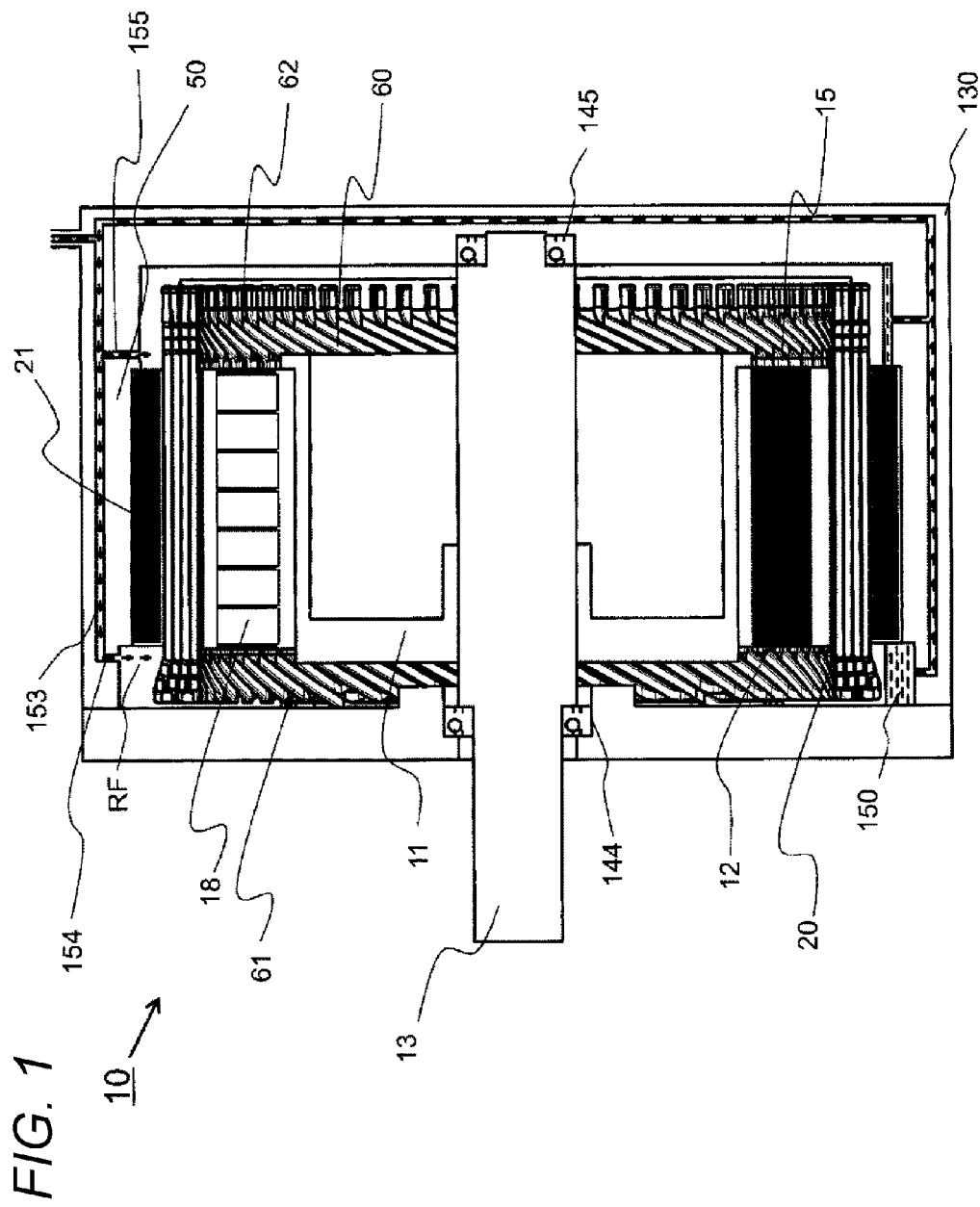
FIG. 1 is a cross sectional view of a dynamo-electric machine apparatus

Hereinafter, a resin composition of the present invention will be described. The resin composition of the present invention contains: (A) an unsaturated-polyester resin as a base (hereinafter, referred to as base unsaturated-polyester resin) and/or a vinyl-ester resin as a base (hereinafter, referred to as base vinyl-ester resin);
(B) a radical-polymerizable monomer as a base (hereinafter, referred to as base radical-polymerizable monomer);
(C) a radical-polymerizable monomer having a thermally latent isocyanate group; and
(D) a photo-radical polymerization initiator.
The resin composition of the present invention may further contain:
(B) an alkyl borane and/or an alkoxy amine derivative, or other optional components.

Hereinafter, the above-described (A) to (B) components and other optional components, constituting the resin composition of the present invention, will be described in detail. The (A) and (B) components are basic materials of the resin composition of the present invention. The resin composition of the present invention is characterized by the (C) to (B) components. Characteristics of each component will be described in description of each component below. At the end, a method for manufacturing the resin composition of the present invention will be described.

[(a) component] Base unsaturated-polyester resin and/or base vinyl-ester resin

The base unsaturated-polyester resin is not particularly limited, and for example, can be obtained by a condensation reaction between a dibasic acid and a polyhydric alcohol, Specific examples of the dibasic acid used as a raw material of the base unsaturated-polyester resin include an α,β-unsaturated dibasic acid such as maleic acid, maleic anhydride, fumaric acid, itaconic acid, or itaconic anhydride; and a saturated dibasic acid such as phthalic acid, phthalic anhydride, halogenated phthalic anhydride, isophthalic terephthalic acid, tetrahydro phthalic acid, tetrahydro phthalic anhydride, hexahydro phthalic acid, hexahydro isophthalic acid, hexahydro terephthalic acid, succinic acid, malonic acid, glutaric acid, adipic acid, sebacic acid, 1,10-decane dicarboxylic acid, 2,6-naphthalene dicarboxylic acid, 2,7-naphthalene dicarboxylic acid, 2,3-naphthalene dicarboxylic acid, 2,3-naphthalene dicarboxylic anhydride, 4,4'-biphenyl dicarboxylic acid, or dialkyl esters thereof. However, the dibasic acid is not particularly limited. Only one kind selected from these dibasic acids or the like may be used, or two or more kinds thereof may be mixed and used appropriately.

Specific examples of the polyhydric alcohol used as a raw material of the base unsaturated-polyester resin include ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bisphenol A and propylene oxide or ethylene oxide, glycerin, trimethylolpropane, 1,3-propanediol, 1,2-cyclohexane glycol, 1,3-cyclohexane glycol, 1,4-cyclohexane glycol, paraxylene glycol, bicyclohexyl-4,4'-diol, 2,6-decalin and tris(2-hydroxyethyl) isocyanurate. However, the polyhydric alcohol is not particularly limited. In addition, an amino alcohol such as ethanolamine may be used. Only one kind selected from these polyhydric alcohols may be used, or two or more kinds thereof may be mixed and used appropriately, dicyclopentadiene compound may be incorporated into a resin skeleton, if necessary.

The base vinyl-ester resin is not particularly limited, but for example, may be obtained by a reaction between an epoxy compound and an unsaturated monobasic acid using an esterification catalyst.

The epoxy compound used as a raw material of the base vinyl-ester resin is not particularly limited as long as the epoxy compound has at least two epoxy groups in a molecule thereof. Specific examples thereof include an epi-bis type glycidyl ether type epoxy resin obtained by a condensation reaction between a bisphenol such as bisphenol A, bisphenol F, or bisphenol F, and epihalohydrin; a novolak type glycidyl ether type epoxy resin obtained by a condensation reaction between novolak which is a condensate of a phenol such as phenol, cresol, or bisphenol, and formaldehyde, and epihalohydrin; a glycidyl ester type epoxy resin obtained by a condensation reaction, between tetrahydrophthalic acid or hexahydrophthalic acid, and epihalohydrin; a glycidyl ether type epoxy resin obtained by a condensation react ion between 4,4'-biphenyl, 2,6-naphthalene diol, hydrogenated bisphenol, or a glycol, and epihalohydrin; and an amine-containing glycidyl ether type epoxy resin obtained by a condensation reaction between hydantoin or cyanuric acid, and epihalohydrin. Only one kind selected from these epoxy compounds may be used, or two or more kinds thereof may be mixed and used appropriately.

The unsaturated monobasic acid used as a raw material of the base vinyl-ester resin is not particularly limited. Specific examples thereof include acrylic acid, methacrylic acid, and crotonic acid. In addition, a half ester of maleic acid, itaconic acid, or the like may be used. Only one kind selected from these unsaturated monobasic acids may be used, or two or more kinds thereof may be mixed and used appropriately.

[(B) component] base radical-polymerizable monomer

Examples of the base radical-polymerizable monomer include styrene, vinyltoluene, vinylnaphthalene, α-methyl styrene, vinyl pyrrolidone, acrylamide, acrylonitrile, allyl alcohol, allyl phenyl ether, a (meth)acrylic acid ester, vinyl acetate, vinyl pyrrolidone, (meth)acrylamide, a diester of maleic acid, and a diester of fumaric acid. However, the base radical-polymerizable monomer is not particularly limited. Styrene, vinyltoluene, or a (meth)acrylic acid ester (for example, methacrylate or acrylate) is preferably used. Examples of the (meth)acrylic acid ester include methyl (meth)acrylate, ethyl(meth)acrylate, propyl(meth)acrylate, butyl (meth)acrylate, 2-ethylhexyl (meth)acrylate, isooctyl (meth)acrylate, isodecyl (meth)acrylate, benzyl (meth)acrylate, phenyl (meth)acrylate cyclohexyl (meth)acrylate, dicyclopentanyl (meth)acrylate, dicyclopentenyl (meth)acrylate isobornyl (meth)acrylate, methoxylated cyclotriene (meth)acrylate, dicyclopentenyloxyethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, polyethylene glycol (meth)acrylate, alkyloxy polypropylene glycol (meth)acrylate, tetrahydrofurfuryl (meth)acrylate, 2-hydroxy-3-phenoxypropyl (meth)acrylate, glycidyl (meth)acrylate, caprolactone-modified tetra furfuryl (meth)acrylate, ethoxycarbonylmethyl (meth)acrylate, 2-ethylhexyl carbitol acrylate, 1,4-butanediol (meth)acrylate, acrylnitrile butadiene methacrylate, and dicyclopentenyloxyethyl methacrylate. Only one kind selected from these compounds may be used, or two or more kinds thereof may be mixed and used appropriately.

[(C) Component] The radical-polymerizable monomer having a thermally latent isocyanate group is used for improving adhesion between a coil surface and a resin composition. Therefore, the radical-polymerizable monomer having a thermally latent isocyanate group is also referred to as an adhesive radical-polymerizable monomer.

Examples of the radical-polymerizable monomer having a thermally latent isocyanate group include a thermally latent isocyanate derivative such as 2-(0-[1'-'methylpropylidene amino]carboxyamino)ethyl methacrylate or 2-(1'-[2,4-dimethylpyrazonyl]carboxyamino)ethyl methacrylate in which an isocyanate group of 2-methacryloyloxyethyl isocyanate, 2-methacryloyloxy ethoxyethyl isocyanate, 2-acryloyloxyethyl isocyanate, or 1,1-bis(acryloyloxymethyl) ethyl isocyanate is protected with a phenol, oxime, dialkyl malonate, lactam, a triazole derivative, an imidazoline derivative, a pyrazole derivative, or the like. Here, the thermal latency indicates that a protecting group is removed by heating at 50° C. or higher and an isocyanate group is generated. Only one kind selected from these compounds may be used, or two or more kinds thereof may be mixed and used appropriately.

[(D) component] The photo-radical polymerization initiator is used for insulation coating of a joining portion of a coil end group.

Examples of the photo-radical polymerization initiator include a benzyl derivative such as diphenylethane dione, di(4-methoxyphenyl)ethanedione, 2,2-dimethoxy-2-phenyl acetophenone, or 2,2-diethoxy-2-phenyl acetophenone; a benzoin derivative such as benzoin, benzoin methyl ether, benzoin ethyl ether, or benzoin isopropyl ether; a benzophenone derivative such as benzophenone, 4,4'-bis(dimethylamino) benzophenone, or 4,4'-dimethoxy benzophenone; a propiophenone derivative such as 2-hydroxy-2-methyl propiophenone or 2-hydroxy-4'-(2-hydroxyethoxy)-2-methyl propiophenone; 2,2-diethoxy acetophenone; anthraquinone; 2-ethyl anthraquinone; 1-hydroxycyclohexyl phenyl ketone; and 2,4-diethyl thioxanthone-9-one. Only one kind selected from these compounds may be used, or two or more kinds thereof may be mixed and used appropriately. An azo compound cannot be used because a nitrogen atom generated at the time of generation of a radical cause a crack in a cured product.

[(E) component] The (E) alkyl borane and/or alkoxy amine derivative are/is used for enhancing heat resistance of the resin composition.

The alkyl borane is a compound having a structure indicated by the lowing formula (1). -G1, -G2, and -G3 each represent —R or —OR independently. At least one of -G1 to -G3 represents —R. —Rs each represent a hydrogen atom, an alkyl group, a cycloalkyl group, an aralkyl group, or an aryl group independently. —OR represents a hydroxyl group, an alkyloxy group, a cycloalkyloxy group, aralkyloxy group, or an aryloxy group.

[Chemical formula 1]

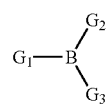

Formula 1

Examples of the boron compound include borane, triethyl borane, tri-propyl borane, tri-isopropyl borane, tri-n-butylborane, tri-n-amyl boran, tri-n-hexyl borane, tricyclohexyl borane, 9-borabicyclo[3.3.1]nonane, isopinocamphenyl borane, diethyl methyl borane, diethyl propyl borane, diethyl butyl borane, and ethyl propyl butyl borane. In order to facilitate handling, borane may be complexed by tetrahydrofuran, triethylamine, pyridine, or triphenylphosphine. Examples of a boron compound oxide in which a part of the boron compound is oxidized, include diethyl ethoxy borane, dibutyl butoxy borane, diethylmethoxy borane, ethyldiethoxy borane, and ethyl ethoxymethoxy borane. Among these compounds, dlethylmethoxy borane or triethyl borane is preferable in view of easy handling in the air. Reactions of these boron compounds are performed in the air because oxy en generates a radical.

The alkoxy amine derivative is a compound having a structure indicated by the following formula (2). —$R^1$ represents a hydrogen atom or an alkyl group. —X and —Y each represent an alkyl group, a cycloalkyl group, an aryl group, or an alkoxycarbonyl group. —$R^2$ and —$R^3$ each represent an alkyl group, a cycloalkyl group, or an alkylene group.

[Chemical formula 2]

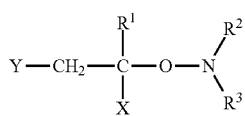

Formula 2

The alkoxy amine derivative is not particularly limited, and can be synthesized from an N-oxyl compound and ethylenically unsaturated monomer in the presence of a radical generating agent.

The radical generating agent used for the above-described reaction, is not particularly limited. Specific examples thereof include a peroxide such as benzoyl peroxide, lauroyl peroxide, tertiary butyl hydroperoxide, cumene hydroperoxide or ditertiary butyl peroxide; and an azobis type radical generating agent such as 2,2'-azobis isobutyronitrile) 1,1'-azobis(cyclohexane carbonitrile), 4,4'-azobis(4-cyano valeric acid), or 2,2'-azobis(2-methylpropionamidine)dihydrochloride.

The N-oxyl compound used for the above-described reaction is not particularly limited. Specific examples thereof include 1-oxyl-2,2,6,6,-tetramethylpiperidine, 1-oxyl-2,2,6,6,-tetramethyl and 4-methoxy-2,2,6,6,-tetramethylpiperidine-1-oxyl. However, the N-oxyl compound is not particularly limited. Only one kind selected from these N-oxyl compounds may be used, or two or more kinds thereof may be mixed and used appropriately.

[Other Optional Components]

An organic peroxide may be added, as another optional component, to the thermosetting resin composition of the present invention, if necessary, in order to accelerate curing. Examples of the organic peroxide include benzoyl peroxide, lauroyl peroxide, t-butyl peroxybenzoate, t-amylperoxy benzoate, t-amyl peroxy neodecanoate, t-butyl peroxy neodecanoate, peroxy isobutyrate, di(t-butyl) peroxide, dicumyl peroxide, cumene hydroperoxide, 1,1-di(t-butylperoxy) cyclohexane, 2,2-di(t-butylperoxy) butane, t-butyl hydroperoxide, di(s-butyl) peroxy carbonate, and methyl ethyl ketone peroxide. However, the organic peroxide is not particularly limited. One kind of these organic peroxides may be used singly, or two or more kinds thereof may be mixed. In addition, a curing accelerator may be added. Examples of the curing accelerator include a metal salt of naphthenic acid or octylic acid (a metal salt of cobalt, zinc, zirconium, manganese, calcium, or the like). Only one kind selected from these curing accelerators may be used, or two or more kinds thereof may be mixed appropriately. A polymerization inhibitor may be blended if necessary. Examples of the polymerization inhibitor include a quinone such as hydroquinone, p-tertiary butyl catechol, or pyrogallol. Only one kind selected from these polymerization inhibitors may be used, or two or more kinds thereof may be mixed appropriately.

[Method for Manufacturing Resin Composition of the Present Invention]

In a method for manufacturing the resin composition of the present invention, first, the (A) to (D) components and other optional components are stirred and mixed uniformly in the air. Thereafter, the (E) component is added thereto at room temperature to obtain the resin composition of the present invention.

The resin composition of the present invention can be used for insulating and fixing a stator coil of a dynamo-electric machine. In addition, for example, when a rotor of dynamo-electric machine has a field coil, the resin composition of the present invention can be used for insulating and fixing the field coil, as in the above-described stator coil.

In embodiments and Examples of the dynamo-electric machine, described below, the resin composition of the present invention manufactured as described above will be referred to as a resin composition 601, and will be applied to a stator coil of a dynamo-electric machine or the like.

——Embodiments of Dynamo-Electric Machine or the Like——

Hereinafter, an embodiment in which the resin composition 601 which is the resin composition of the present invention is applied to a dynamo-electric machine or the like will be described. In the following description, as an example of the dynamo-electric machine, an electric motor used in a hybrid car will be used. In the following description, an "axial direction" indicates a direction along a rotation axis of the dynamo-electric machine. A circumferential direction indicates a direction along a rotation direction of the dynamo-electric machine. A "radial direction" indicates a direction of a radius vector (radial direction) with the rotation axis of the dynamo-electric machine as the center. An "inner circumferential side" indicates a radially inward (inner diameter side). An "outer circumferential side" indicates an opposite direction thereto, i.e. a radially outward (outer diameter side).

FIG. 1 is a cross sectional view illustrating the dynamo-electric machine including a stator, according to the present invention. A dynamo-electric machine 10 includes a housing 50, a stator 20, a stator core 21, a stator coil 60, and a rotor 11.

The stator 20 is fixed on an inner circumferential side of the housing 50. The rotor 11 is rotatably supported on an inner circumferential side of the stator 20. The housing 50 constitutes an envelope of an electric motor, molded into a cylindrical shape by cutting a ferrous material such as carbon steel, or casting or pressing cast steel or an aluminum alloy. The housing 50 is also referred to as a frame body or a frame, A liquid cooling jacket 130 is fixed on an outer circumferential side of the housing 50. An inner circumferential wall of the liquid cooling jacket 130 and an outer circumferential wall of the housing 50 constitute a refrigerant passage 153 of a liquid refrigerant RF such as oil. The refrigerant passage 153 is formed so as not to leak liquid. The liquid cooling jacket 130 houses bearings 144 and 145, and is also referred to as a bearing bracket.

In direct liquid cooling, the refrigerant RF passes through the refrigerant passage 153, and flows out toward the stator 20 from the refrigerant outlets 154 and 155 to cool the stator 20. The refrigerant RF is stored in a refrigerant (oil) storage space 150.

The stator 20 includes the stator core 21 and the stator coil 60. The stator core 21 is manufactured by laminating silicon steel plates. The stator coil 60 is wound around many slots 15 provided in an inner circumferential part of the stator core 21. Heat generated in the stator coil 60 is transferred to the liquid cooling jacket 130 through the stator core 21, and is radiated by the refrigerant RF flowing in the liquid cooling jacket 130.

A join-side coil end 62 which is a coil end of the stator coil 60 is provided at one end of the stator 20 in the axial direction. The join-side coil end 62 has a joining portion joined by welding. On the other hand, a counter-join-side coil end 61 which is a coil end of the stator coil 60 is provided at the other end of the stator 20 in the axial direction. Details of the join-side coil end 62 and the counter-join-side coil end 61 will be described below.

The rotor 11 includes a rotor core 12 and a rotation axis 13. The rotor core 12 is manufactured by laminating silicon steel plates. The rotation axis 13 is fixed in the center of the rotor core 12. The rotation axis 13 is rotatably held by the bearings 144 and 145 mounted in the liquid cooling jacket 130, and rotates at a predetermined position in the stator 20 and at a position opposed to the stator 20. The rotor 11 is provided with a permanent magnet 18 and an end ring (not illustrated).

In assembling the dynamo-electric machine 10, in advance, the stator 20 is inserted into the housing 50 and attached to an inner circumferential wall of the housing 50, and then the rotor 11 is inserted into the stator 20. Subsequently, what has been thus obtained is incorporated into the liquid cooling jacket 130 such that the bearings 144 and 145 are fitted to the rotation axis 13.

Figure 2:
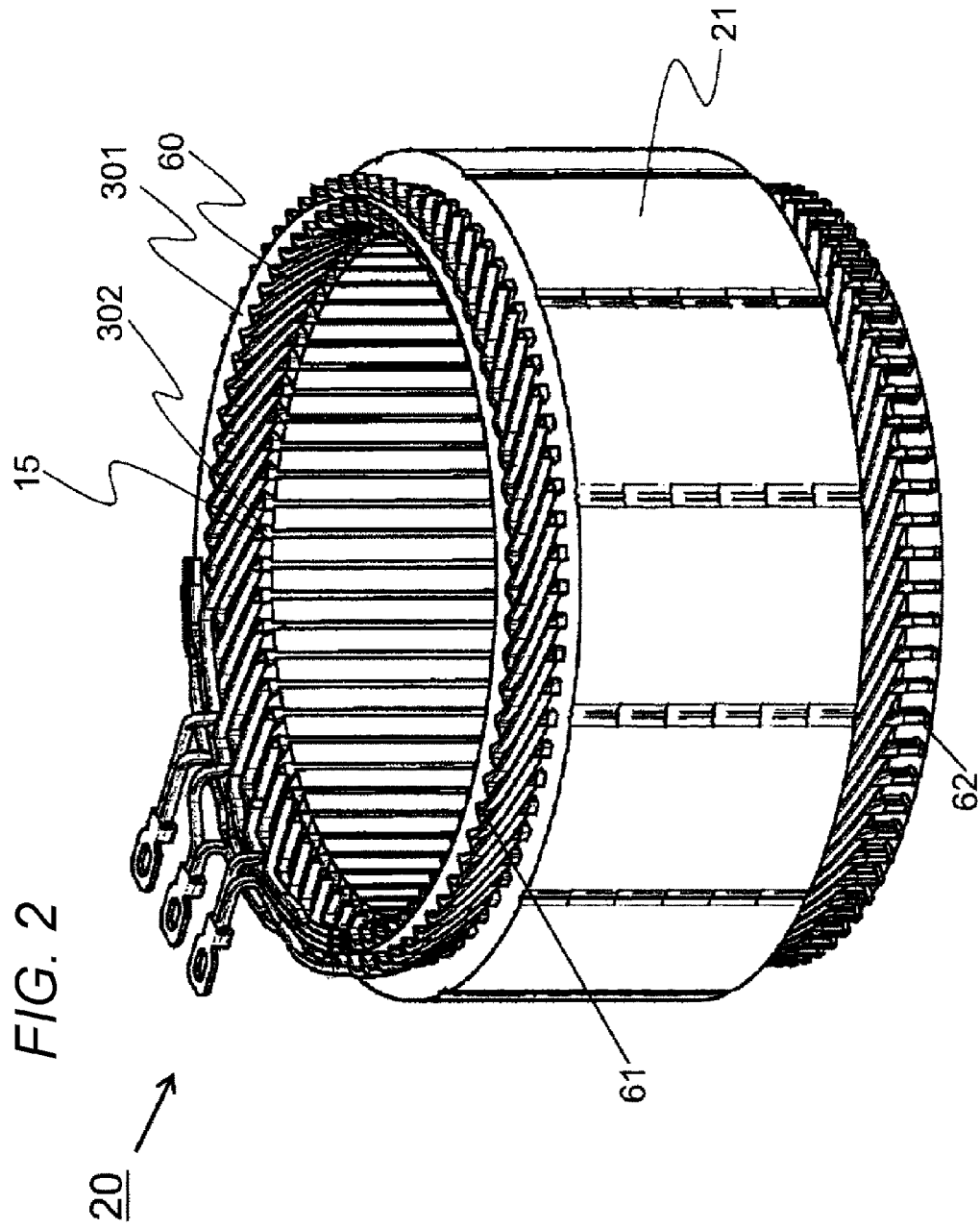
FIG. 2 is a perspective view of a stator.

A detailed structure of a main part of the stator 20 used for the dynamo-electric machine 10 in the present Example will be described with reference to FIG. 2. The stator 20 includes the stator core 21 and the stator coil 60 wound around the many slots 15 provided in the inner circumferential part of the stator core 21. A conductor (copper wire in the present Example) having a substantially rectangular cross section is used for the stator coil 60. This improves a space factor in the slot and improves an efficiency of the dynamo-electric machine.

A slot liner 302 is disposed in each slot 15 to secure electrical insulation between the stator core 21 and the stator coil 60. The slot liner 302 is formed into a B shape or an S shape so as to wrap the copper wire. Insulating paper 301 is disposed annularly for insulating the coils of the stator coil 60 from each other.

The who stator coil 60 is coated using the resin composition 601 only. That is, both the loin-side coil end 62 and the counter-join-side coil end 61 are coated using one kind of resin composition, i.e., the resin composition 601. This is an excellent point of the present invention, different, from the prior art. As described above, by coating the stator cord 60 using the resin composition 601 only, manufacturing using one kind of manufacturing equipment is possible.

In the related art, it is necessary to coat a region except for the coil end 62 in the stator coil 60 using a first resin composition, and to coat the join-side coil end 62 using the first resin composition and a second resin composition. That is, it is necessary to coat the stator coil 60 using two kinds of resin compositions. Here, the region except for the loin-side coil end in the stator coil 60" includes the counter-join-side coil end 61 and a region inserted into the slot 15 in the stator coil 60. As described above, when two kinds of resin compositions are used, two kinds of manufacturing equipments are necessary.

Hereinafter, it will be specifically described that the stator coil 60 of the stator 20 in the dynamo-electric machine of the present invention is coated using the resin composition 601 only, that is, using one kind of resin composition. In order to show a difference from the prior art, a coating situation of the join-side coil end 62 (FIG. 6) and a coating situation of a region except for the join-side coil end 62 (FIG. 4) are illustrated. As an example of a coating situation of a region except for the join-side coil end 62, a coating situation of the counter-join-side coil end 61 (FIG. 4) is illustrated.

Figure 3:
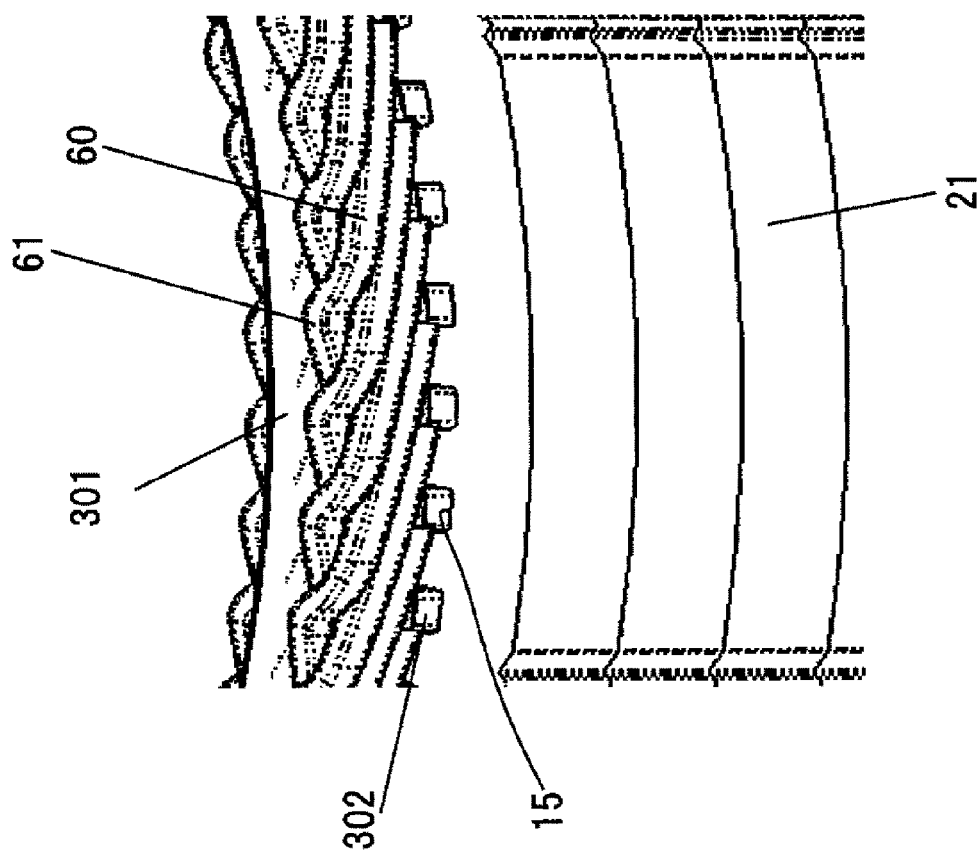
FIG. 3 is a view around a counter-join-side coil end of a stator coil.

FIG. 3 is an enlarged view around the counter-join-side coil end 61 of the stator 20 in the dynamo-electric machine 10, seen from an outer circumferential side of the stator 20. The stator 20 includes the stator core 21 and the stator coil 60 wound around the many slots 15 provided in the inner circumferential part of the stator core 21. The stator coil 60 is formed of a conductor having a substantially rectangular cross section. Insulating paper 300 is disposed annularly for insulating the coils from each other. The insulating paper 301 is disposed annularly for securing electrical insulation. The slot liner 302 is disposed in each slot 15 to secure electrical insulation between the stator core 21 and the stator coil. 60.

Figure 4:
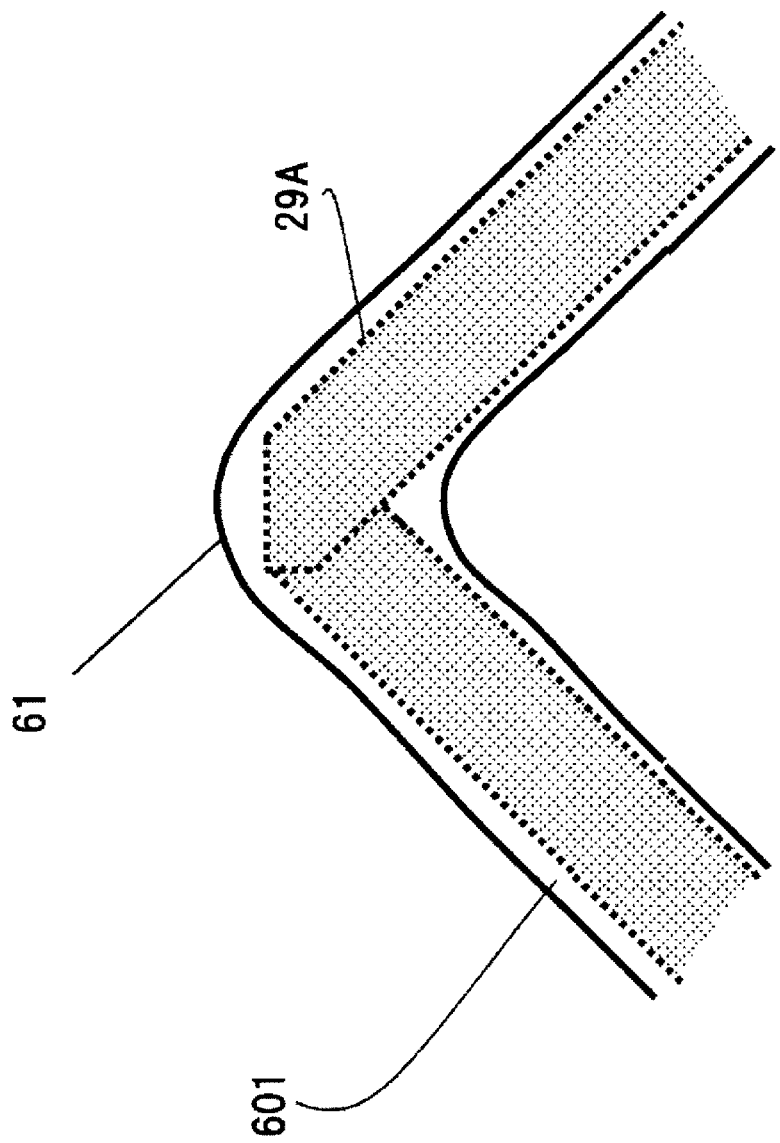
FIG. 4 is a view of the counter-join-side coil end of the stator coil.

FIG. 4 illustrates the coating situation of the counter-join-side coil end 61. In the whole counter-join-side coil end 61, an insulated coated section 29A coated with an insulating film such as an enameled film is formed. The insulated coated section 29A is coated using the resin composition 601 only, and the thickness thereof is almost uniform. Here, as an example of a coating situation of a region except for the join-side coil end. 62, the coating situation of the counter-join-side coil end 61 is illustrated. However, coating situations of the other regions except for the join-side coil end 62 are similar thereto.

Figure 5:
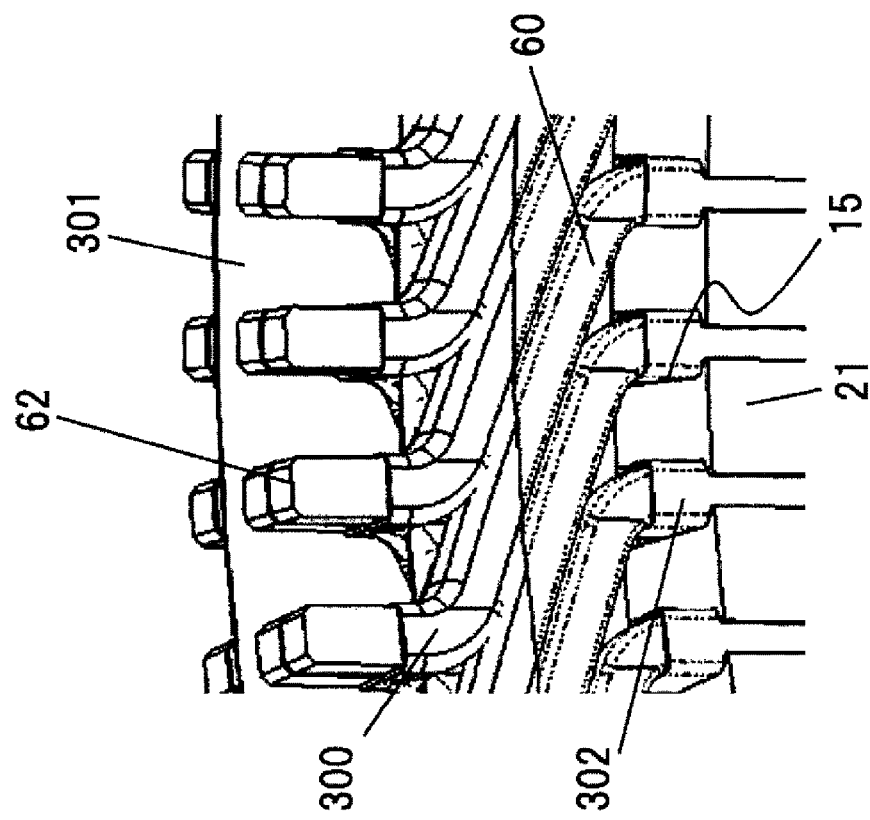
FIG. 5 is a view around a join-side coil end of the stator coil.

FIG. 5 is an enlarged view around the join-side coil end 62 of the stator 20 in the dynamo-electric machine 10, seen from an inner circumferential side of the stator 20. The stator 20 includes the stator core 21 and the stator coil 60 wound around the many slots 15 provided in the inner circumferential part of the stator core 21. The stator coil 60 is formed of a conductor having a substantially rectangular cross section. The insulating paper 300 is disposed annularly for insulating the coils from each other. The insulating paper 301 is disposed annularly for securing electrical insulation. A slot liner 302 is disposed in each slot 15 to secure electrical insulation between the stator core 21 and the stator coil 60.

Figure 6:
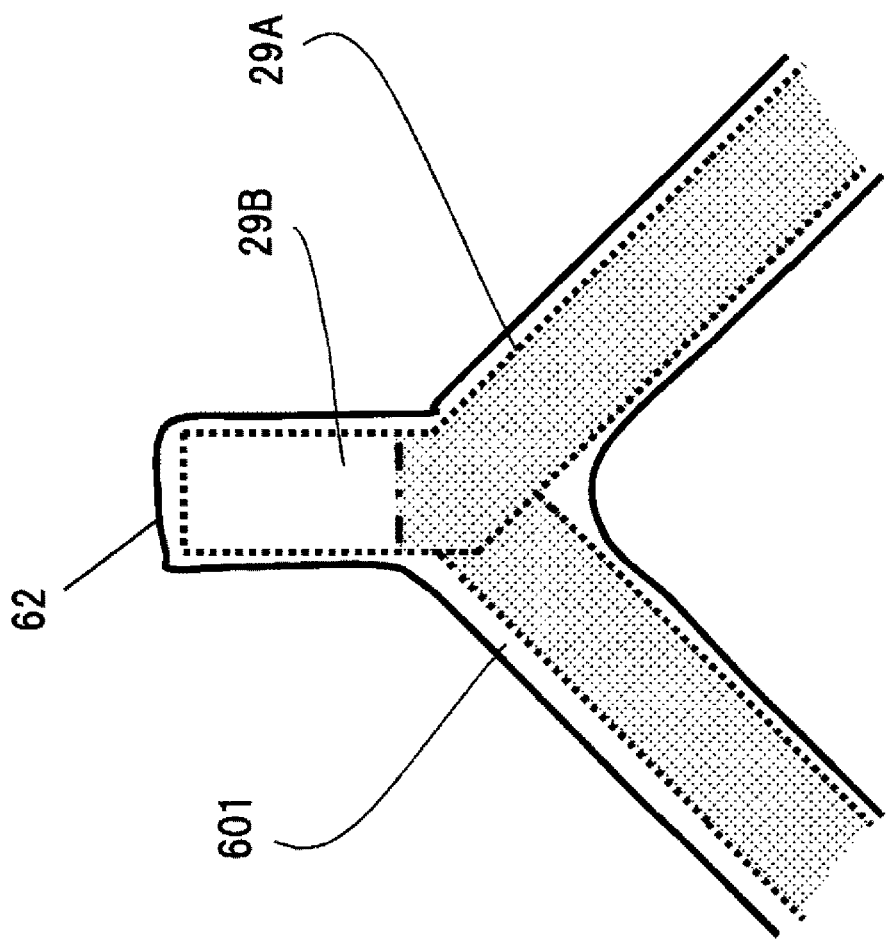
FIG. 6 is a view of the join-side coil end of the stator coil.

FIG. 6 illustrates the coating situation of the join-side coil end 62. The join-side coil end 62 includes the insulated coated section 29A coated with an insulating film such as an enameled film and a conductor-exposing section 29B in which the insulating film is peeled off and the conductor is exposed for joining. The conductor-exposing section 29B is provided at an end of the conductor, and is welded to become a coil end joining portion. The insulated coated section 29A and the conductor-exposing section 293 are coated using the resin composition 601 only, and the thicknesses thereof are almost uniform.

A method for coating a coil portion of the stator 20 using the resin composition 601 for realizing the above-described coating situation will be described. A coil as a member for a dynamo-electric machine is impregnated with the resin composition 601 using a dipping method, a drop impregnation method, or the like. The impregnation method may be an ordinary method, and is not particularly limited. The coil which has been impregnated with the resin is irradiated with an energy ray, and the irradiation part is thereby cured. The energy ray is preferably an ultraviolet ray generated by a mercury lamp or the like. A wavelength can be selected appropriately according to the photo-radical polymerization initiator as the (D) component. After irradiation with the energy ray, the resin composition 601 coated on the stator 20 is cured completely by heating. This heating may be performed by an ordinary method such as heating with a warm-air heating furnace or an IH heating furnace, and is not particularly limited. In Examples described below, an example of this coating method will be described.

In the above description, as the (A) component constituting the resin composition 601, an unsaturated-polyester resin is used from viewpoints of cost, an insulation property, permeability, a curing property, and the like. A solvent type unsaturated-polyester resin in which the resin is diluted with a solvent or a solvent-free unsaturated-polyester resin in which the resin is not diluted with a solvent can be used. However, the solvent-free unsaturated-polyester resin is more preferable because swelling due to volatilization of a solvent does not occur in curing. A non-styrene unsaturated-polyester resin is still more preferable in order to prevent deterioration of characteristics due to volatilization of a component in curing.

In the description of being coated using the resin composition 601 only almost uniformly, the term "only" does not exclude the presence of an insulating film formed on a conductor in advance, such as an enameled film. Here, the term "only" means that an insulating resin provided for imparting an insulating property and a fix property after the stator coil 60 is molded is the resin composition 601 only and a second resin member in the related art is not used. The term "one kind of" used in the "one kind of resin composition" is used to mean the same as "only" described here.

A winding method of the stator coil 60 in the above embodiment is distributed winding. However, the present invention can be applied also to another winding method such as concentrated winding.

The dynamo-electric machine in the above embodiment is an inner rotor type dynamo-electric machine. However, the present invention can be similarly applied to an outer rotor type dynamo-electric machine, an axial gap type dynamo-electric machine, and the like.

The dynamo-electric machine 10 in the above embodiment is a dynamo-electric machine having a permanent magnet type rotor. However, the present invention can be applied to an induction type dynamo-electric machine, a synchronous reluctance type dynamo-electric machine, a dynamo-electric machine having a claw bole type rotor, and the like.

The joining portion in the present embodiment is joined by welding. However, it is not necessary to limit the joining method to welding.

When the present invention is applied to a dynamo-electric machine having a rotor with winding field, it is also possible to use the resin composition 601 of the present invention to the field coil. In this sense, the resin composition 601 of the present invention can be applied to a rotor and a stator which are members for a dynamo-electric machine.

EXAMPLES

As described below, as examples of the above resin composition 601, compositions 1 to 5 were manufactured actually, and were evaluated. Evaluation items were coatability, permeability, adhesiveness, and heat resistance. For comparison, resin compositions in the related art were manufactured as Comparative Examples 1 and 2, and were evaluated similarly. Evaluation results are shown collectively in the table illustrated in FIG. 7.

As composition examples of the resin composition of the present invention, Composition Examples 1 to 5 of the resin composition 601 will be described. The Composition Examples 1 to 5 contain:

(A) a base unsaturated-polyester resin and/or a base vinyl-ester resin;

(B) a base radical-polymerizable monomer;

(C) a radical-polymerizable monomer having a thermally latent isocyanate group (adhesive radical-polymerizable monomer); and (D) a photo-radical polymerization initiator.

Some composition examples further contain:

(E) an alkyl borane and/or an alkoxy amine derivative; or other optional components. Details thereof will be described below. The present invention is not limited to these composition examples.

As composition ranges of the above components, the (C) component is preferably from 1 to 10 parts by weight, the (D) component is preferably from 0.1 to 5 parts by weight, and the (E) component is preferably from 0.2 to 5 parts by weight, relative to 100 parts by weight of the (A) (B) component.

This is because the (C) component less than 1 part by weight does not improve adhesion. The (C) component more than 10 parts by weight makes the effect of improving adhesion reach a ceiling, and is not economical. The (D) component less than 0.1 parts by weight makes curing insufficient. On the other hand, the (D) component more than 5 parts by weight makes the effect of curing reach a ceiling, and is not economical. The (E) component less than 0.2 parts by weight makes curing insufficient. On the other hand, this is because the (E) component more than 5 parts by weight makes the effect of curing reach a ceiling, and is not economical.

Composition Example 1

As Composition Example 1, an unsaturated-polyester resin composition containing the following (A) to (E) components was used.

(A) component: 50 parts by weight of an unsaturated-polyester resin containing a bisphenol A skeleton and having a number average molecular weight of 3000

(B) component: 50 parts by weight of styrene (C) component: 5 parts by weight of 2-(1'[2,4-dimethyl-pyrazonyl]carboxyamino)ethyl methacrylate (D) component: 0.1 parts by weight of 2-hydroxy-2-methyl propiophenone (E) component: 0.2 parts by weight of diethyl methoxy borane Composition Example 2

As Composition Example 2, an unsaturated-polyester resin composition containing the following (A) to (E) components was used.

(A) component: 50 parts by weight of a bisphenol A type vinyl ester resin (B) component: 50 parts by weight of styrene (C) component 5 parts weight of 2-(1'[2,4-dimethylpyrazonyl]carboxyamino)ethyl methacrylate (D) component: 0.1 parts by weight of 2-hydroxy-2-methyl propiophenone (E) component: 0.2 parts by weight, of diethyl methoxy borane Composition Example 3

As Composition Example 3, an unsaturated-polyester resin composition containing the following (A) to (E) components was used.

(A) component: 30 parts by weight of a bisphenol A type vinyl ester resin.

(B) component: 70 parts by weight of dicyclopentenyloxyethyl(meth)acrylate (C) component: 5 parts by weight of 2-(1'[2,4-dimethyl-pyrazonyl]carboxyamino)ethyl methacrylate (D) component: 0.1 parts by weight of 2-hydroxy-2-methyl propiophenone (E) component: 0.2 parts by weight of diethyl methoxy borane Composition Example 4

As Composition Example 4, an unsaturated-polyester resin composition containing the following (A) to (E) components and other optional components was used.

(A) component: 25 parts by weight of a bisphenol A type vinyl ester resin (B) component: parts by weight of dicyclopentenyloxyethyl(meth)acrylate (C) component: 5 parts by weight of 2-(1'[2,4-dimethyl-pyrazonyl]carboxyamino)ethyl methacrylate (D) component: 0.1 parts by weight of 2-hydroxy-2-methyl propiophenone (E) component: 0.1 parts by weight of diethyl methoxy borane other optional components: 0.5 parts by weight of 1,1-di(t-butylperoxy)cyclohexane Composition Example 5

As Composition Example 5, an unsaturated-polyester resin composition containing the following (A) to (C) components and other optional components was used.

(A) component: 25 parts by weight of a bisphenol A type vinyl ester resin (B) component: 75 parts by weight of dicyclopentenyloxyethyl(meth)acrylate (C) component: 5 parts by weight of 2-(1'[2,4-dimethyl-pyrazonyl]carboxyamino)ethyl methacrylate (D) component: 0.1 parts by weight of 2-hydroxy-2-methyl propiophenone other optional components: 0.5 parts by weight of 1,1-di(t-butylperoxy)cyclohexane.

Comparative Example 1

As Comparative Example 1, an unsaturated-polyester resin composition containing the following (A) to (C) components, (E) component, and other optional components was used.

(A) component: 25 parts by weight of a bisphenol A type vinyl ester resin (B) component: 75 parts by weight of dicyclopentenyloxyethyl(meth)acrylate (C) component: 5 parts by weight of 2-(1'[2,4-dimethyl-pyrazonyl]carboxyamino)ethyl methacrylate (E) component: 0.1 parts by weight of diethyl methoxy borane other optional components: 0.5 parts by weight of 1,1-di(t-butylperoxy)cyclohexane.

Comparative Example 2

As Comparative Example 2, an unsaturated-polyester resin composition containing the following (A) and (B) components and other optional components was used.

(A) component: 25 parts by weight of a bis phenol A type vinyl ester resin (B) component: 75 parts by weight of dicyclopentenyloxyethyl(meth)acrylate other optional components: 0.5 parts by weight of 1,1-di(t-butylperoxy)cyclohexane.

A method for evaluating Composition Examples 1 to 5 and Comparative Examples 1 and 2 which are unsaturated-polyester resin compositions manufactured as described above, and evaluation results thereof will be described below. Evaluation results are shown collectively in FIG. 7.

1) Coatability and permeability: The stator 20 was cut into four equal parts to obtain TEST pieces. A resin composition was dropped to the TEST piece from the join-side of the coil 60 at room temperature. Thereafter, the TEST piece was irradiated with an ultraviolet ray using a high pressure mercury lamp for one minute, and then heated with a warm air circulation type thermostat at 120° C. The resulting TEST piece was cut at a position 2 mm apart from an end at the join-side of the coil 60, and a coating thickness was measured as an indicator of coatability. In permeability, a TEST piece in which a resin permeated through the TEST piece to a core end surface at a counter-join-side after decomposition was evaluated as ○, and a TEST piece in which a resin did not permeate through the TEST piece to the core end surface at the counter-join-side after decomposition was evaluated as x.

Evaluation results are shown in the column (1) in FIG. 7. In all of Composition Examples 1 to 5 and Comparative Examples 1 and 2, a resin permeated through the TEST piece to a core end surface at a counter-loin-side, and therefore permeability was evaluated as ○. The coating thicknesses in Composition Example 1, Composition Example 2, Composition Examples 3 and 4, Composition Example 5, and Comparative Examples 1 and 2 were 35 μm, 30 μm, 50 μm, 45 μm, and 0 μm, respectively. It is considered that there was a large difference between Composition Examples 1 to 5 and Comparative Examples 1 and 2 because the (D) component for improving coatability was included in Composition Examples 1 to 5.

2) Adhesiveness: A stracker-like TEST piece was manufactured using an enameled wire (AIW) coated using polyamideimide and having a rectangular cross section of 3 mm×2 mm. This TEST piece was impregnated with the resin composition 601, and then heated with a warm air circulation type thermostat at 120° C. for two hours. Thereafter, a tensile fracture TEST was performed at 23° C. using an autograph DSS-5000 manufactured by Shimadzu Corporation. In the tensile fracture TEST, a distance between fulcrums was 150 mm, a crosshead speed was 5 mm/min, and adhesion was a load when the TEST piece was withdrawn.

Evaluation results are shown in the column (2) in FIG. 7. Adhesion in each of Composition Examples 1 and 2 and Comparative Example 1 was 1.0 kN. Adhesion in each of Composition Examples 3 to 5 was 1.1 kN. Adhesion in Comparative Example 2 was 0.8 kN. It is considered that adhesion only in Comparative Example 2 was small as compared to those in Composition Examples 1 to 5 and Comparative Example 1 because the (C) component for improving adhesiveness was not included only in Comparative Example 2.

3) Heat resistance Heat resistance was determined by an ordinary method using a helical coil TEST method. AIW of φ1 mm was used for an enameled wire.

Evaluation results are shown in the column (3) in FIG. 7. In Composition Examples 1 to 4 and Comparative Example 1, heat resistance to 180° C. was observed. That is Composition Examples 1 to 4 and Comparative Example 1 correspond to an H type as a division of heat resistance. On the other hand, in Composition Example and Comparative Example 2, heat resistance to 150° C. was observed. That is, Composition Example 5 and Comparative Example 2 correspond to an F type as a division of heat resistance. It is considered that there was a difference in heat resistance between Composition Examples 1 to 4 and Comparative Example 1, and Composition Example 5 and Comparative Example 2 because the (E) component for improving heat resistance was included in Composition Examples 1 to 4 and Comparative Example 1.

As described above, according to the present invention, it is possible to provide a member for a dynamo-electric machine such as a stator or a rotor, having an excellent insulating property and an excellent cooling property in spite of being small and having a high output.

The present invention is not limited to Examples described above, but includes various modification examples. For example, Examples described above are described in detail in order to describe the present invention so as to be understood easily, and are not necessarily limited to those including all the components described. In addition, some components in Examples can be deleted or replaced by another component, or another component can be added thereto.

REFERENCE SIGNS LIST

10 dynamo-electric machine
11 rotor
12 rotor core
13 rotation axis
15 slot
18 permanent magnet
20 stator
21 stator core
5 housing
60 stator coil
61 counter-join-side coil end
62 loin-side coil end
29A insulated coated section
29B conductor-exposing section
130 liquid cooling jacket.
144 bearing
145 bearing
150 refrigerant (oil) storage space
153 refrigerant passage
154 refrigerant outlet
155 refrigerant outlet
300, 301 annular insulating paper
302 slot liner
601 resin composition
RF refrigerant

The invention claimed is:

1. A member for a dynamo-electric machine, comprising a coil formed with an insulation coated conductor, wherein
   the coil is coated using a resin composition containing:
   a base unsaturated-polyester resin and/or a base vinylester resin,
   a base radical-polymerizable monomer,
   a radical-polymerizable monomer having adhesiveness to the insulating film of the insulation coated conductor (hereinafter, referred to as adhesive radical-polymerizable monomer), and
   a photo-radical polymerization initiator.

2. The member for a dynamo-electric machine according to claim 1, wherein the coil is coated with only the resin composition.

3. The member for a dynamo-electric machine according to claim 1, wherein the adhesive radical-polymerizable monomer contained in the resin composition is a radical-polymerizable monomer having a thermally latent isocyanate group.

4. The member for a dynamo-electric machine according to claim 1, wherein the resin composition further contains an alkyl borane and/or an alkoxy amine derivative.

5. A dynamo-electric machine using the member for a dynamo-electric machine according to claim 1.

6. A resin composition comprising:
   a base unsaturated-polyester resin and/or a base vinylester resin;

a base radical-polymerizable monomer;

a radical-polymerizable monomer having adhesiveness to an insulating film of an insulation coated conductor (hereinafter, referred to as adhesive radical-polymerizable monomer); and a photo-radical polymerization initiator.

7. The resin composition according to claim 6, wherein the adhesive radical-polymerizable monomer is a radical-polymerizable monomer having a thermally latent isocyanate group.

8. The resin composition according to claim 5, further comprising an alkyl borane and/or an alkoxy amine derivative.

\* \* \* \* \*